Figure 1:
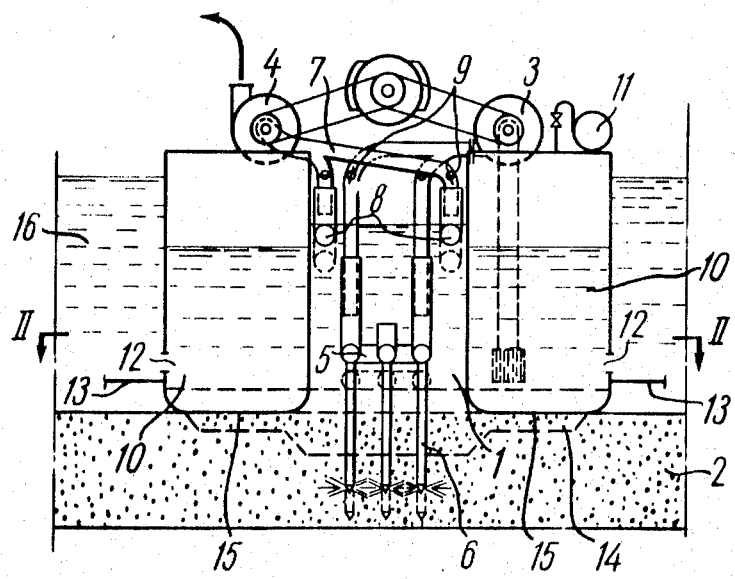

United States Patent [19]
Volokh

[11] 3,732,983
[45] May 15, 1973

[54] APPARATUS FOR CLEANING LOOSE FILTERING MATERIAL IN SLOW WATER FILLED WATER SUPPLY FILTERS

[76] Inventor: Boris Fedotovich Volokh, ulitsa Pastera, 4, kv. 44, Odessa, U.S.S.R.

[22] Filed: Mar. 29, 1971

[21] Appl. No.: 128,857

[52] U.S. Cl. ................................................210/273
[51] Int. Cl. ............................................B01d 23/24
[58] Field of Search..............................210/271, 273

[56] References Cited

UNITED STATES PATENTS
1,617,654  2/1927  Sivade...................................210/273

Primary Examiner—Samih N. Zaharna
Attorney—Waters, Roditi, Schwartz & Nissen

[57] ABSTRACT

An apparatus for cleaning loose filtering material in slow water-filled water supply filters, comprising a washing chamber equipped with means for its movement relative to the surface of the loose filtering material being cleaned. Mounted inside the washing chamber are washing tubes to feed clean water into the layer of filtering material to be washed. The washing chamber communicates with a suction pipe which evacuates dirty water therefrom. The chamber is provided with means for regulating its pressure upon the filtering material by controlling its degree of buoyancy.

2 Claims, 2 Drawing Figures

APPARATUS FOR CLEANING LOOSE FILTERING MATERIAL IN SLOW WATER FILLED WATER SUPPLY FILTERS

The invention relates to equipment for cleaning loose filtering materials, and particularly to apparatus used to clean the loose filtering material in slow-operating water supply filters.

Known in the art is an apparatus to clean loose filtering materials in slow water-filled water supply filters, which comprises a washing chamber. The chamber is open from below, its open side adjoining in the course of work the layer section of the filtering loose material being cleaned. Two opposite side walls of the chamber have bottom portions that are bent aside from the chamber, and slide against the layer of the filtering material being treated as the chamber moves therealong. The other two opposite side walls have edges extending downward below said bent off portions, which edges cut into the filtering layer during the chamber movement. The bent off portions of two side walls and the extending edges of the other two side walls bound in plan the section of the filtering material which is being cleaned.

Disposed inside the chamber are washing tubes serving to feed washing water into the filtering layer being cleaned, the tubes being submerged into the filtering material to a specified depth during the operation of the apparatus.

The washing tubes are connected to a continuous header communicating the washing chamber to the environment through the washing tubes. Also available in the chamber is a suction pipe for evacuating dirty water. The chamber is secured to a cable which is connected to a winch mounted beyond the filter, and serving to move the chamber along the surface of the filtering layer.

When the apparatus is in operation, the chamber is sunk into the filter under the water layer, and placed onto the filtering material. As the pump which evacuates water from the wash chamber is set into action, the extending edges of the side walls and the washing tubes fully submerge into the filtering layer, the chamber thus tightly seating on its surface. Vacuum is generated in the wash chamber, and the starting water contained in the filter enters the header under atmospheric pressure, and then the washing tubes, thereupon passing into the layer of filtering material. The layer of filtering material is stirred, the dirt being carried away to the suction pipe wherefrom it is pumped out along a hose to the sewerage. In the process of cleaning, the chamber is moved along the layer of filtering material. The washing tubes are in the suspended layer of the filtering material, thus not encountering any large resistance in the course of the chamber movement.

After the washing chamber has been pulled all across the length of the filter, having cleaned a strip of the filtering layer of a width equaling that of the washing chamber, the latter is displaced to the adjacent strip, the cleaning cycle being resumed.

However, the prior art apparatus has the disadvantage, that it does not permit regulating the force of the chamber pressure on the layer of the filtering material being cleaned according to the depth of submersion of the washing tubes, and the depth of the water layer in the filter, which involves the need to use unduly large forces for moving the chamber against the layer of filtering material. Large forces to move the chamber are also required due to the fact that evacuation of dirty water from the chamber induces suction of the latter to the filtering layer. Moreover, shifting the chamber from one strip to another requires hoisting mechanisms, such as a crane.

An object of the invention is to provide an apparatus for cleaning slow water supply filters, that allows rapid and simple adjustment of an optimum chamber pressure on the layer of filtering material irrespective of the suction pump operation, the depth of submersion of the washing tubes, or the depth of the layer of the starting water in the filter, which makes possible realizing uninterrupted movement of the washing chamber with a minimum pulling force during its operation. Additionally, said apparatus requires no additional hoisting equipment for shifting the chamber from one strip of the filtering material being cleaned, to another.

With said object in view, in an apparatus for cleaning loose filtering material in slow water-filled water supply filters, comprising a washing chamber equipped with means for its movement relative to the surface of the loose filtering material being cleaned, washing tubes fitted inside the chamber to feed clean water into the layer of loose filtering material to be washed through, and a suction pipe to evacuate dirty water from the washing chamber, the apparatus, according to the invention, is provided with means for regulating its pressure upon the layer of filtering material, and its degree of buoyancy.

The means for regulating the pressure of the washing chamber upon the layer of filtering material, and its degree of buoyancy, are preferably made in the form of at least one container incorporating facilities for its filling with a regulated amount of a gas medium.

The washing chamber may communicate with the atmosphere.

Figure 2:
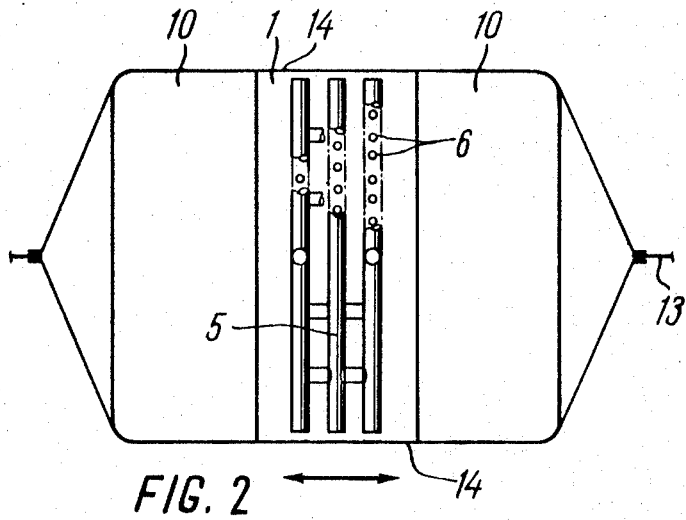

The invention is further exemplified with the description of particular embodiments thereof with reference to the appended drawings, wherein:

FIG. 1 is a schematic illustration in longitudinal sectional view of the apparatus for cleaning loose filtering material in slow water supply filters according to the invention; and FIG. 2 is section taken on line II—II in FIG. 1.

The apparatus for cleaning loose filtering materials in slow water-filled water supply filters comprises a washing chamber 1 (FIG. 1), the open bottom of which adjoins the layer of filtering material 2 being cleaned, of the slow water supply filter. Mounted on the housing of the washing chamber 1 are pumps 3 and 4.

Pump 3 is connected through a distributing header 5 to washing tubes 6, and serves to deliver wash water into the layer of the filtering material 2 being cleaned, while pump 4 through a suction pipe 7 communicates with drain pipes 8, and serves to draw away dirty water.

The length of pipes of the distributing header 5 equals the width of the washing chamber 1, as is shown in FIG. 2, their number depending on the desired efficiency of the apparatus.

In the pipes connecting pumps 3 and 4 (FIG. 1) with the distributing header 5 and the drain pipes 8, respectively, throttles 9 are placed.

Both the distributing header 5 with washing tubes 6, and the drain pipes 8 can be vertically displaced and fixed at any required depth, e.g. by screws (not shown).

The washing chamber 1 communicates with the atmosphere, which rules out the possibility of a vacuum being created therein in the process of exhausting wash water with dirt, thus precluding any suction effect of the washing chamber 1 against the layer of the filtering material 2 being cleaned, and reducing the pulling force required to move the washing chamber 1.

Communication of the washing chamber 1 with the atmosphere also excludes accumulation of the air released in washing through the filtering material, inside the washing chamber 1, thereby providing normal conditions for the operation of pump 4 sucking off dirty water.

The washing chamber 1 is supplied with two containers 10 serving to regulate its pressure on the filtering material by varying its degree of buoyancy. Containers 10 are connected to a source 11 of a compressed gas, which for example, may be an air compressor. The compressed gas source 11 should have a capacity to develop a pressure sufficient to expel water from containers 10 when the water layer in the water supply filter to be cleaned has its maximum depth. Water enters containers 10 and leaves them through openings 12.

Secured to the walls of the washing chamber 1 is a cable 13 of a pulling winch (not shown), which can be mounted both on the housing of the washing chamber 1, or beyond the slow water supply filter.

The possible direction of movement of the washing chamber 1 with respect to the layer of filtering material is shown by arrows in FIG. 2.

The side walls 14 of the washing chamber 1 are made to extend downwards below the bottoms 15 (FIG. 1) of containers 10, so that during the movement of the washing chamber 1 their extending edges cut into the layer of the filtering material 2. Bottoms 15 of containers 10 and the extending edges of the side walls 14 limit in plan the section of the filtering material 2 being cleaned. The plan dimensions of the washing chamber 1 are chosen according to the required efficiency of the apparatus. The height of the washing chamber 1 should advantageously be more, than the maximum thickness of the layer of water 16 contained in the slow water supply filter during its cleaning.

The apparatus for the cleaning of loose filtering material in slow water-filled water supply filters operates as follows.

The washing chamber 1 is sunk into the water-filled water supply filter whose filtering material is to be cleaned.

Pump 4 evacuates water from the washing chamber 1 and discharges it to the sewerage. Set into action together with pump 4 is pump 3 which takes the starting water contained in the water supply filter, and feeds it to the distributing header 5 and therefrom into the washing tubes 6. The water issuing from the washing tubes 6 washes away the loose filtering material 2, thus providing for free and rapid submersion of the washing tubes 6 and the extending edges of walls 14 into the layer of filtering material 2.

Within the area confined by the washing chamber the layer of filtering material 2 is stirred up to the depth of submersion of the washing tubes 6, resulting in the formation of a suspended layer of filtering material which lifts to the washing chamber 1.

Air released while washing through the filtering material 2, having passed through the layer of water in the washing chamber 1, escapes to the atmosphere.

Due to the continuous suction of water from the washing chamber 1, there is formed therein a steady water flow directed toward the drain pipes 8. This flow draws into the drain pipes 8 the dirt washed off as a result of stirring the filtering material 2, which dirt is then exhausted by pump 4.

The washing chamber 1 is pulled across the entire length of the water supply filter, the washing tubes 6 being all this time located within the suspended layer of the filtering material 2, and thus meeting no substantial resistance during the movement of the washing chamber 1.

In the course of movement of the washing chamber 1 the pressurized wash water is fed to the forward pipe of the distributing header 5, with respect to the direction of movement of the washing chamber 1, while the dirty water is pumped out through the rear drain pipe 8, for which purpose the appropriate throttles 9 are closed or opened. This reduces the required pulling force on cable 13, the discharge of wash water, and the amount of fine sand carried away to the sewerage.

After the washing chamber 1 has been pulled all across the length of the water supply filter, having cleaned a strip of the layer of filtering material 2 with a width equaling that of the washing chamber 1, the latter is imparted with positive buoyancy. The washing chamber 1 completely floats in the water, and by applying an insignificant force it is shifted to the adjacent strip, where the cleaning cycle is resumed.

The imparting of positive buoyancy to the washing chamber 1, as well as the adjusting of its pressure upon the layer of filtering material 2 is effected by filling containers 10 with a required amount of gas medium, which is regulated according to the depth of submersion of the washing tubes 6 into the layer of filtering material 2, and the depth of the water layer in the water supply filter.

THe proposed apparatus ensures a high degree of washing of the filtering material, is simple in operation, and features low power consumption.

The described apparatus can as well be employed for cleaning filtering material in water-filled infiltration basins.

What I claim is:

1. An apparatus for cleaning loose filtering material in slow water-filled water supply filters, comprising: a washing chamber having an open bottom and submersible in the water of the filter to rest on the surface of a layer of filtering material to be cleaned; means for moving said washing chamber on the surface of the layer of filtering material; washing tubes mounted in said chamber to feed clean water into said layer of filtering material to be washed; a suction pipe in said chamber to evacuate dirty water from said washing chamber; and means for regulating the degree of buoyancy of the washing chamber in the water of the filter to regulate the pressure of said washing chamber upon the layer of filtering material, said means for regulating the degree of buoyancy of said washing chamber comprising at least one closed container associated with said chamber, said container having a lower port through which water in the filter can enter and leave the container and means for filling said container with a controlled amount of gas.

2. Apparatus as claimed in claim 1 wherein said washing chamber has an open top to communicate with the atmosphere.

* * * * *